US006911170B2

(12) United States Patent
Speier et al.

(10) Patent No.: US 6,911,170 B2
(45) Date of Patent: Jun. 28, 2005

(54) SPRAY DIFFUSERS AND METHOD AND MOLD FOR MANUFACTURE OF SAME

(75) Inventors: Juergen Speier, Reutlingen (DE); Rudolf Notz, Dettingen (DE)

(73) Assignee: Lechler GmbH, Metzingen (DE)

( * ) Notice: Subject to any disclaimer, the term of this patent is extended or adjusted under 35 U.S.C. 154(b) by 409 days.

(21) Appl. No.: 10/156,067

(22) Filed: May 29, 2002

(65) Prior Publication Data

US 2002/0180100 A1 Dec. 5, 2002

(30) Foreign Application Priority Data

May 30, 2001 (DE) ........................................ 101 27 597

(51) Int. Cl.[7] ................................................ B29C 33/42

(52) U.S. Cl. ....................... 264/219; 264/299; 264/318; 264/325; 264/328.1; 425/542

(58) Field of Search ................................ 264/219–227, 264/299, 318, 325, 328.1; 425/542

(56) References Cited

U.S. PATENT DOCUMENTS 5,060,869 A * 10/1991 Bekius ....................... 239/599

* cited by examiner

*Primary Examiner*—Stefan Staicovici
(74) *Attorney, Agent, or Firm*—Crowell & Moring LLP

(57) ABSTRACT

A method and a mold used with this method for manufacturing cast spray diffusers is described in which, in order to prevent an expensive reworking of important corners and edges, the molded parts are formed is such a way that mold parting planes are moved out of these critical areas. In particular, the transitional area between a rotationally symmetric swirl chamber of a spray diffuser in the narrow mouthpiece channel and the outlet edge of the mouthpiece are each placed in one-piece molded parts that abut against these adjacent molded parts outside these areas.

5 Claims, 3 Drawing Sheets

SPRAY DIFFUSERS AND METHOD AND MOLD FOR MANUFACTURE OF SAME

BACKGROUND AND SUMMARY OF THE INVENTION

This application claims the priority of German Application No. 101 27 597.8 filed May 30, 2001, the disclosure of which is expressly incorporated by reference herein.

The invention relates to a method for manufacturing spray diffusers which have flow compartments and connected mouthpieces having a narrowed cross section for the discharge of the liquid to be diffused and which are manufactured using multi-part molds whose hollow spaces in their negative form correspond to the outer and inner dimensions of the spray diffusers and are filled with liquid or thixotropic manufacturing material that is then made to solidify.

In the manufacture of spray diffusers that are produced using a casting process, providing cores for the creation of the internal configuration is known, while the outer configuration, especially with the manufacture of ceramic nozzles, is produced using plaster molds. The cores are destroyed after the casting operation; the plaster molds can be used more often.

FIG. 2 schematically shows the appearance of a mold for the manufacture of ceramic nozzles according to the prior art. One can see that the interface between the core (not depicted here in detail) and a mouthpiece plug 50 lies within the area of the cross-sectional narrowing of flow chamber 51 to outlet channel 52 of mouthpiece 53. A configuration of this type is selected in consideration of the finished moldability. The interface between outer mold part 54, which is adjacent to mouthpiece 50, which continues with a further upper molded part in a manner not shown in greater detail, is situated in the area of the outlet edge of mouthpiece 53. Since the mold parts can never fit against each other exactly, mold parting seams result at these mold parting places because the manufacturing material runs into these parting gaps of the molds. At the two aforementioned places, at outlet edge 55 and at the transition on flow chamber 51 to the narrowed cross-section of mouthpiece 53, thus at position 56, mold parting seams are therefore produced which as a rule must be manually removed after extraction of the cast spray diffuser. Since these places 55 and 56 in spray diffusers are decisive for the quality and function of the spray diffuser because the flow path and interruption of the spray stream are affected here, the finishing work must be carried out thoroughly and at great expense. To explain this, reference is made in this connection to the fact that spray diffuser 57, shown in FIG. 2, is a swirl spray diffuser for producing a hollow-cone spray stream, the liquid to be sprayed being fed in the direction of arrow 58. The liquid that is fed in principle enters tangentially into flow chamber 51, which as a rule is rotational symmetric, is set in rotation by the tangential entry so that a liquid film forms on the walls and then transitions into mouthpiece 53 at position 56 and, by reversal in the direction of rotation, transitions into a tangential and axial speed at outlet edge 55 and forms a liquid screen in the shape of a hollow cone that disintegrates into droplets just past outlet edge 55. It therefore depends very much on the exact observance of the internal configuration.

An object of the present invention is to propose a manufacturing method, and a mold suitable for this method, with which it is possible to prevent to a great extent the expensive finishing work on the aforementioned critical areas. To achieve this objective, it is provided in a method of the type mentioned at the outset that the outlet edges of the mouthpiece and the transitional areas of the inner wall between flow chamber and mouthpiece are each formed out wall areas of one-piece molded parts that abut against the adjacent molded parts outside these wall areas. By this configuration, the two critical areas 55 and 56 are depicted in FIG. 2 are produced without mold parting seams since there are no mold parting seams located within these areas. The mold parting places are situated at non-critical places, so that secondary machining does not require any great expense.

In a further development of certain preferred embodiments of the present invention, a mold for carrying out the method of the aforementioned type can be provided which is provided with a core and at least one mouthpiece plug, as is also the case for the state of the art. However, in contrast to the prior art, the mouthpiece plug is now provided with the negative in the shape of a circumferential groove and is configured in such a manner that it abuts against adjacent molded parts only outside this groove.

In a further development of certain preferred embodiments of the present invention, it is also advantageously possible to provide the mouthpiece plug with a ring whose perimeter corresponds to the transitional area of the inner wall between flow chamber and mouthpiece. This ring, which is adapted to the expanding inner contour of the flow chamber that is situated before the mouthpiece, can, as will be explained in greater detail below, be placed by the inner chamber of the mold onto the mouthpiece so that the mold release operation is not hindered. It is thus appropriate in a further development of the invention to place this ring on an axially projecting pin of the mouthpiece plug and hold it there, it being possible to provide this projecting pin with a non-circular cross-section in order to prevent the ring from twisting in relation to the mouthpiece plug. This projecting pin can also engage into the core, so that a twisting between mouthpiece and supplementary ring is safely avoided, and the manufacture of a cast spray diffuser is possible without problems. After mold release it is only necessary, as already mentioned, to remove the mold parting seams, which, however, are not located on the critical areas and therefore are relatively simple to remove without affecting the functional quality of the diffuser.

The present invention is described on the basis of embodiments in the drawing and is explained in the following.

Other objects, advantages and novel features of the present invention will become apparent from the following detailed description of the invention when considered in conjunction with the accompanying drawings.

DETAILED DESCRIPTION OF THE DRAWINGS

Figure 1:
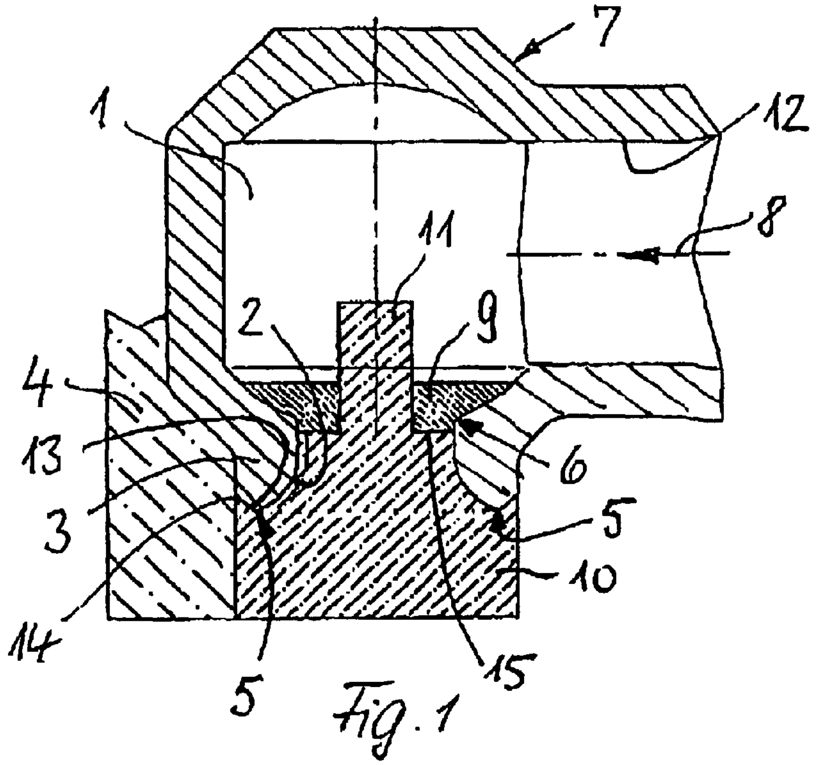
FIG. 1 is a schematic representation of the basic structure of a mold for carrying out the method of the invention.
Figure 2:
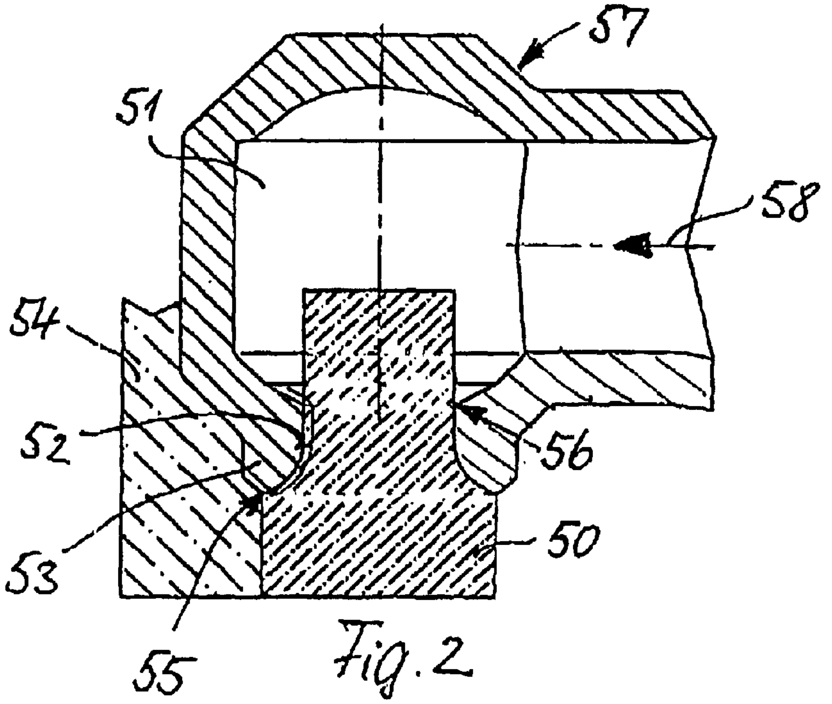
Fig. 2 PRIOR ART
FIG. 2 is the analogous representation to FIG. 1 of a mold according to the state of the art for manufacturing a spray diffuser.

FIG. 1 shows, analogously to FIG. 2, a part of a spray diffuser 7 that is to be manufactured using a casting process, for example in a ceramic or other type of material. This spray diffuser 7 is provided with an inlet channel 12 through which the liquid to be sprayed is introduced in the direction of arrow 8 into flow chamber 1, which is a swirl chamber. The mold provided for manufacture of this spray diffuser 7 is comprised of a mouthpiece plug 10 that is inserted into a lower mold part 4 in order to accomplish the manufacture of mouthpiece 3 with the narrowed outlet channel 2 opposite flow chamber 1. This mouthpiece plug 10, in comparison to mouthpiece plug 50 in the state of the art (FIG. 2), is formed with a larger diameter and with a circumferential groove 13 that has the negative form of outlet edge 5 of spray diffuser 7. This mouthpiece plug 10 formed in this way abuts at position 14 against outer molded part 4 (not shown), which naturally completely surrounds mouthpiece plug 10 and also continues upward in another mold.

Figure 3:
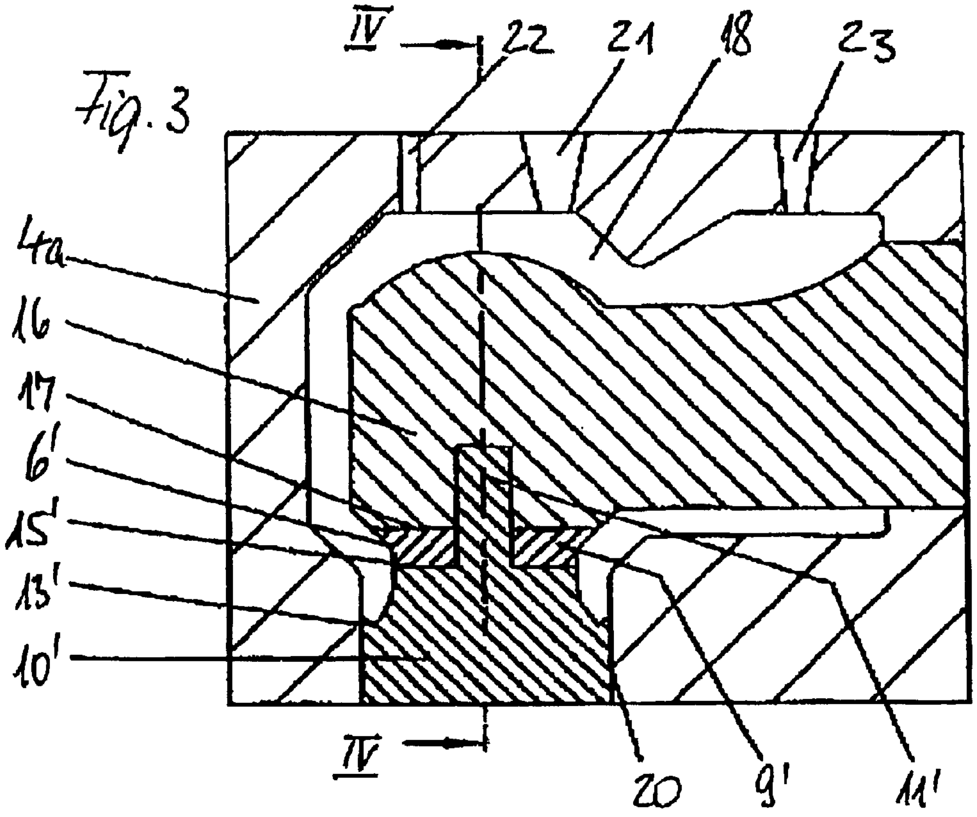
FIG. 3 is a longitudinal section through a complete mold for manufacturing a spray diffuser, constructed according to a preferred embodiment of the invention.
Figure 4:
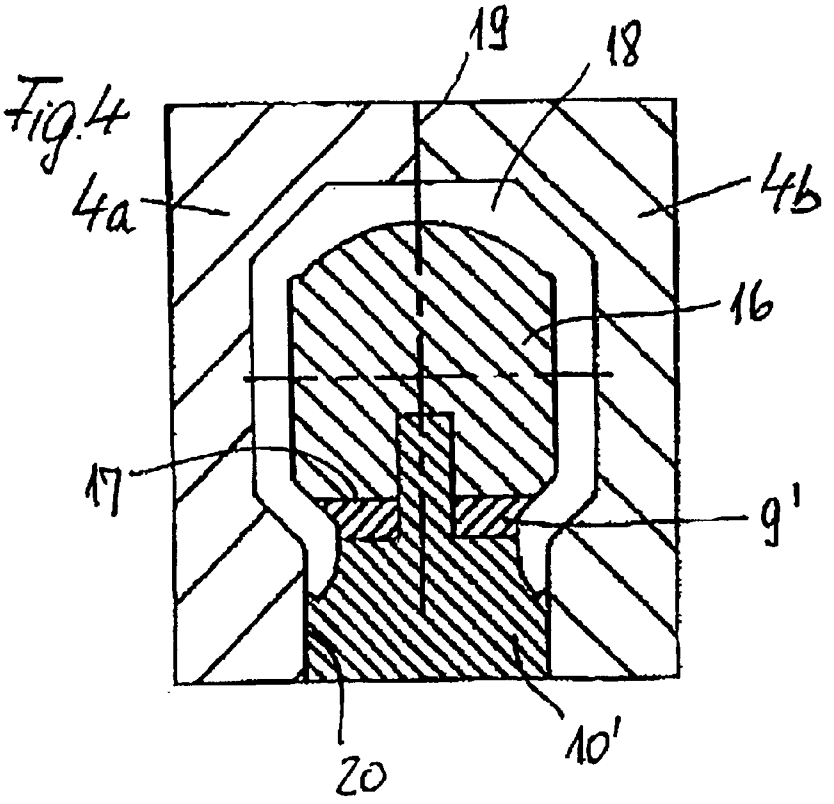
FIG. 4 is a cross-sectional view through the mold of FIG. 3 taken in the direction of cutting plane IV.

This is explained again in detail with reference to FIGS. 3 and 4. A mold parting point therefore occurs at position 14 and not in the area of the outlet edge 5 of spray diffuser 7.

Moreover, mouthpiece plug 10 is provided in its area that projects into subsequent flow chamber 1 with an axially projecting pin 11 on which is attached from within a ring 9 that lies on a support surface 15 of mouthpiece plug 10. Ring 9 has a part of the inner contour of flow chamber 1. However, it is also provided on its perimeter with the negative form of transitional area 6 from flow chamber 1 to mouthpiece 3. This transitional area is therefore also arranged at a distance from the parting plane between ring 9 and mouthpiece plug 10, which coincides with support surface 15. Therefore, in the casting operation there end up being no mold parting seams at critical positions 5 and 6. These, rather, are to be expected in the area of support surface 15 outside or at position 14, likewise outside, where they can be removed relatively easily after the casting operation and after hardening of spray diffuser 7, and this without affecting the dimensional accuracy of the spray diffuser. Expensive finishing work is therefore not required.

Figure 5:
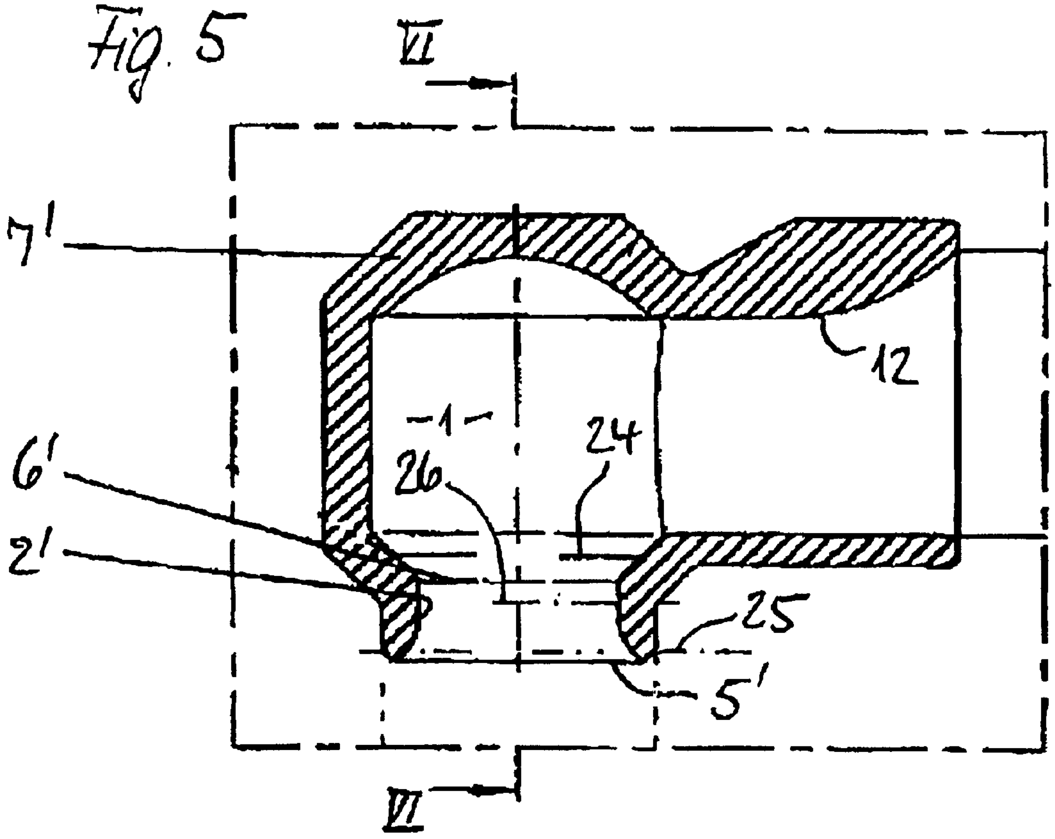
FIG. 5 is a longitudinal sectional view through a spray diffuser manufactured using the mold and the manufacturing process according to FIG. 3.
Figure 6:
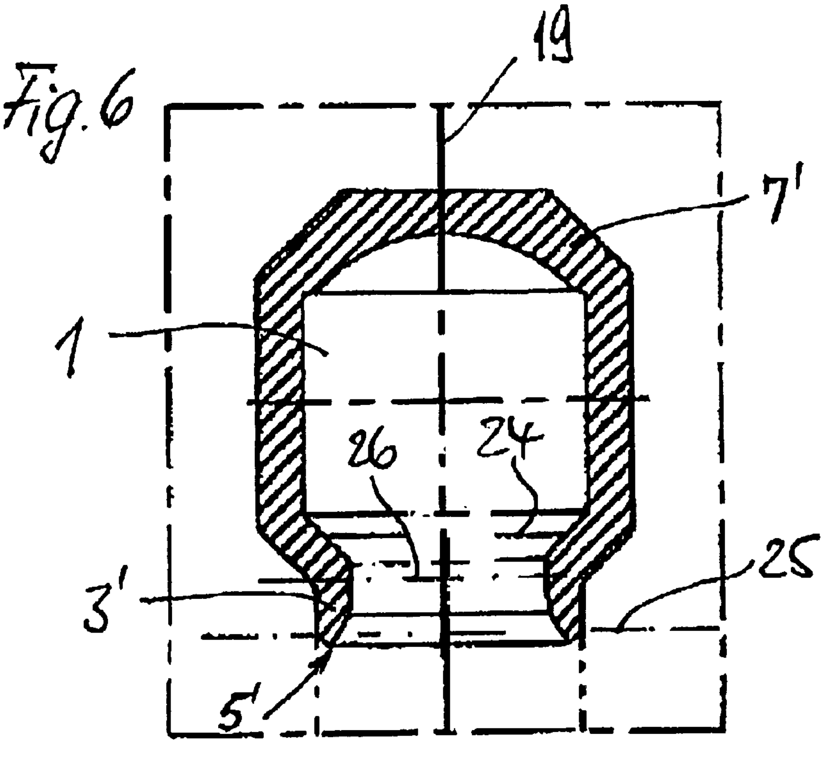
FIG. 6 is a sectional view through the spray diffuser of FIG. 5 taken in the direction of cutting plane VI—VI.

FIGS. 3 and 4 then show only schematically, and for the purpose of explanation, the overall mold structure that is necessary for carrying out the method according to the invention. The thing to be recognized here first is core 16, which fills in inlet channel 12 and flow chamber 1 before the casting operation, and into which pin 11' of mouthpiece plug 10' projects. This pin 11'—just as pin 11 mentioned in relation to FIG. 1—can have a non-circular cross-section that projects into the correspondingly non-circular recesses of ring 9' or 9, respectively, and into a corresponding recess of core 16. This configuration namely ensures a twist-proof layering of mouthpiece plug 10', ring 9' and core 16. Mouthpiece plug 10' in this case is formed in the same way as mouthpiece plug 10 according to FIG. 1. It therefore has circumferential groove 13' from which outlet edge 5' of the spray diffuser 7' shown in FIGS. 5 and 6 is later formed.

The core, which in other respects rests on the top surface 17 of ring 9', is surrounded by two mold halves 4*a* and 4*b*, which, together with core 16, form a hollow chamber 18 in which spray diffuser 7' (FIGS. 5 and 6) is later formed. Mold halves 4*a* and 4*b* lie against each other in a parting plane 19 and between them form a circular opening 20 in which mouthpiece plug 10' can be inserted.

For the manufacture of spray diffuser 7', material in liquid or thixotropic form for production of the nozzle is filled in through an opening 21 at a suitable position into hollow space 18 and remains in this hollow space 18 until the structural constitution of the material has solidified. That can occur for example by cooling or also by drying. The air present in hollow space 18 can escape through openings 22 and 23 during the filling operation, i.e. in the casting operation.

Since, on the one hand, mold halves 4*a*, 4*b* and, on the other hand, also mouthpiece plugs 10', ring 9', which can be characterized as the inner mouthpiece plug, and the remaining molded parts never fit together smoothly and exactly, mold parting seams result at the parting places between these mold parts. In the embodiment shown, mold parting seams therefore result in parting plane 19 between the mold halves 4*a* and 4*b*, but also in the plane of support surface 15' between mouthpiece plugs 10' and ring 9' and in the plane of support surface 17 between ring 9' and core 16. However, all these parting planes lie within areas that are not decisive for the later dimensional and contour accuracy of the spray diffuser that is to be manufactured. The decisive areas of the later outlet edge 5' (FIGS. 5 and 6) or the transitional area 6' have no mold parting seam, because with the manufacturing method using the corresponding mold form, one must make sure that the mold parting planes do not lie within these critical areas.

The result of this, as also becomes clear in relation to FIGS. 5 and 6, is that finishing work for the removal of mold parting seams is only necessary at the interfaces of planes 24 and 26 on the inner side of the spray diffuser and at the interface of plane 25 with the outer side of the spray diffuser, but which do not create any problems since these are essentially flat surfaces.

The new manufacturing method therefore permits spray diffusers to be manufactured in a simple manner. In this case the removal of the mold parting seams is the last work operation before a given needed surface treatment of the nozzle or before the firing.

The new manufacturing method has been described for a spray diffuser that is provided with a flow chamber 1 formed as a swirl chamber, which is narrowed down toward a mouthpiece 3'. The feeding of the liquid to be sprayed into swirl chamber 1 in this case occurs in an essentially tangential manner.

However, it is also completely possible to conceive of the idea of the present invention of moving mold parting seams out of the area of critical flow edges or reversing areas, even with other spray diffusers. Thus, even for a fan nozzle, the transitional area from the axial inlet to the crossover edge for the outlet slot and the break-off edge of this outlet slot itself, for the case that such nozzles are cast, can also be designed in mold areas at which no mold parting is carried out. Because of the considerably complex shaping of such fan nozzles, which do not always have rotationally symmetric flow guides, such fan nozzles nevertheless are manufactured as a rule via mechanical machining and not via a casting process. However, in the described embodiments of swirl nozzles with an essentially rotationally symmetric swirl chamber and mouthpiece outlet channel, the present invention offers decisive advantages.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of making a spray diffuser having a flow chamber, a flow chamber outlet mouthpiece with a narrowed cross-section as compared to the flow chamber, and a transitional area from the flow chamber to the flow chamber outlet mouthpiece and an outlet edge of the mouthpiece, said method comprising:

providing a multi-part mold forming hollow spaces corresponding to inner and outer surfaces of flow chamber walls to be formed, flowing manufacturing material into said hollow spaces, and thereafter hardening said material to from a cast diffuser, wherein said providing a multi-part mold includes disposing mold parting planes away from preselected areas of the spray diffuser to be formed, which preselected areas are important for achieving a desired flow of fluids during use of the spray diffuser, thereby obviating a need for precise machining of said preselected areas, wherein said preselected areas comprise the transitional area from the flow chamber to the flow chamber outlet mouthpiece and an outlet edge of the mouthpiece.

2. Method according to claim 1, wherein the mold is comprised of a core having at least one mouthpiece plug, wherein the mouthpiece plug is provided with outlet edges molded into the form of a circumferential groove.

3. A method according to claim 2, wherein the mouthpiece plug is provided with a ring corresponding to a part of the flow chamber, and whose circumference corresponds to the transitional area.

4. A method according to claim 3, wherein the ring is held onto an axially projecting pin of the mouthpiece plug.

5. A method according to claim 4, wherein the projecting pin has a non-circular cross-section.

* * * * *